United States Patent [19]

Khosropour

[11] Patent Number: 4,887,460

[45] Date of Patent: Dec. 19, 1989

[54] APPARATUS FOR MEASURING THE VIBRATIONAL CHARACTERISTICS OF A MUFFLER

[75] Inventor: Mostafa M. Khosropour, Madison, Wis.

[73] Assignee: Nelson Industries, Inc., Stoughton, Wis.

[21] Appl. No.: 298,964

[22] Filed: Jan. 19, 1989

[51] Int. Cl.[4] .......... G01M 19/00

[52] U.S. Cl. .......... 73/118.1; 73/579

[58] Field of Search .......... 73/118.1, 579, 493, 73/514; 181/212, 264, 271, 272

[56] References Cited

U.S. PATENT DOCUMENTS 4,416,350 11/1983 Hayashi .......... 181/272

4,523,466 6/1985 Lubin et al. .......... 73/579

*Primary Examiner*—Jerry W. Myracle

*Attorney, Agent, or Firm*—Andrus, Sceales, Starke & Sawall

[57] ABSTRACT

An apparatus for measuring the vibrational characteristics of a muffler and including a metal adapter having an internal cooling chamber. One end of the adapter is attached to a connecting member, such as a nut, that is secured to the outer surface of the muffler, while an accelerometer is mounted on the opposite end of the adapter and measures the vibrational characteristics of the muffler under operating conditions. A cooling medium, such as water, is continually flowed through the internal chamber of the adapter to minimize transfer of heat from the muffler to the accelerometer. The adapter is designed to maximize the cooling effect with a minimum increase in mass.

12 Claims, 1 Drawing Sheet

FIG.2
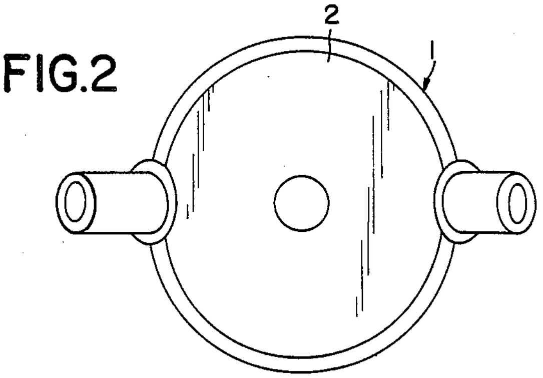
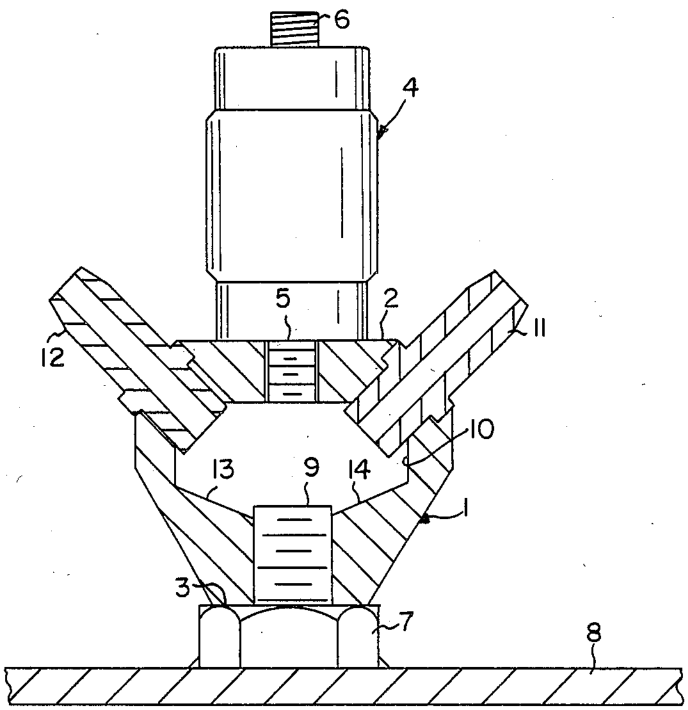
FIG.1

APPARATUS FOR MEASURING THE VIBRATIONAL CHARACTERISTICS OF A MUFFLER

BACKGROUND OF THE INVENTION

Muffler as used with equipment such as tractors, trucks, bulldozers, and the like have a resonant frequency during engine operation that varies with engine speed and load. It is important that the resonant frequency of the muffler be different from that of the vibrational frequency of the operating equipment itself, otherwise harmonic vibrations could be set up in the muffler which could substantially reduce the life of the muffler. To overcome this potential problem, muffler designs should be tested with the operating equipment or on a shaker for the purpose of determining the vibrational frequency of the muffler under varying operating conditions.

Accelerometers are used to measure the acceleration of moving bodies. However, mufflers have an outer body temperature generally in the range of 800° F. to 1200° F. during operation. Although accelerometers have been designed with special material to be used in environments up to 670° F., a conventional accelerometer cannot be used with a muffler at the muffler operating temperature.

Therefore, there has been a need to develop a device which could measure the vibrational characteristics of equipment, such as an exhaust muffler, that operates at high temperatures.

SUMMARY OF THE INVENTION

The invention is directed to an apparatus for measuring the acceleration or vibrational characteristics of a device operating at high temperatures, such as a muffler. In accordance with the invention, the apparatus includes a metal adapter having a pair of opposite ends and defining an internal chamber. A nut is welded to the outer surface of the muffler body and one end of the adapter carries a stud which is threaded to the nut to connect the adapter to the muffler. An accelerometer is secured to the opposite end of the adapter and the accelerometer acts to measure the vibrational characteristics of the muffler under operating conditions.

To minimize heat transfer from the muffler to the accelerometer, a cooling medium, such as water, is flowed through the internal chamber of the adapter.

The adapter is formed of a lightweight metal, such as aluminum alloy, and is designed to maximize cooling and minimize an increase in mass.

The apparatus of the invention can be used to measure the vibrational characteristics of equipment, such as an exhaust muffler, that operates at temperatures up to 1400° F.

The device is small and light in weight so that the mass of the device will not adversely effect the vibrational measurements.

The device is small in size and can be applied either to flat or contoured surfaces.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation with parts broken away in section of the apparatus of the invention; and FIG. 2 is an end view of the adapter.

DESCRIPTION OF THE ILLUSTRATED EMBODIMENT

The drawings illustrate a device for measuring the acceleration or vibrational frequency of a high temperature component, such as an exhaust muffler. The apparatus includes an adapter 1, which is formed of a lightweight metal, such as an aluminum alloy. Adapter 1 is formed with a pair of generally flat parallel end surfaces 2 and 3.

A conventional accelerometer 4, which is used to measure acceleration of moving parts, is mounted on end surface 2 via a threaded stud 5, which is threaded within aligned openings in surface 2 and the end of the accelerometer 4. The outer end of accelerometer 4 carries a coaxial connection 6 which is connected via a coaxial cable to vibrational measuring equipment located at a remote location. The measuring equipment can take the form of a readout which will measure the vibrational amplitudes in g's, and their frequences, with one g equalling 32.2 ft./sec./sec.

As shown in FIG. 1, a nut 7 is welded to the outer surface of muffler body 8 and a threaded stud 9 interconnects nut 7 and an opening in the end surface 3 of adapter 1. By threading the stud 9 down in nut 7, the adapter can be conveniently attached to the muffler body.

As shown in FIG. 1, adapter 1 defines an internal chamber 10. An inlet nipple 11 is connected to a suitable source of cooling medium, such as water, and serves to deliver cooling water to the chamber 10, while an outlet nipple 12 communicates with chamber 10 and serves to discharge the cooling medium from the chamber to a disposal site. Inlet 11 and outlet 12 are located at an acute angle with respect to the axis of adapter 1 and the axes of the nipples 11 and 12 face generally toward the sloping bottom surfaces 13 and 14, respectively of chamber 10. The design of the adapter and the inlet and outlet nipples 11,12 provides a maximum cooling effect to minimize heat transfer from the muffler body 8 to the accelerometer 4, thus maintaining the accelerometer within its normal temperature operating limits of 250° F.

The apparatus of the invention can be used to determine the vibrational characteristics of the muffler at various engine speeds and loads. The amplitude of the vibration can be measured as acceleration (g's), or velocity (peak inches/second), or displacement (peak-to-peak milli-inch) and monitored at the remote readout station.

The adapter 1 is small in size, generally having a diameter less than one inch, and as it is composed of a lightweight material such as aluminum alloy, the mass of the adapter is relatively small compared to that of the muffler, so that the adapter will not adversely effect the vibrational frequency readings being made by the accelerometer.

Moreover, the adapter is constructed and designed to maximize the cooling to maintain the accelerometer within its operational temperature limits, even though the surface temperature of the muffler may be at a temperature up to 1400° F.

Various modes of carrying out the invention are contemplated as being within the scope of the following claims particularly pointing out and distinctly claiming the subject matter which is regarded as the invention.

I claim:

1. A device for measuring the vibrational characteristics of a muffler, comprising a metal adapter having an internal passage, connecting means for securing the adapter to the outer surface of a muffler, an accelerometer secured to said adapter and constructed and arranged to measure the vibrational characteristics of said muffler under operating conditions, and cooling means for flowing a cooling medium through said passage to thereby minimize heat transfer from said muffler to said accelerometer.

2. The device of claim 1, wherein said cooling means comprises an inlet conduit communicating with said passage and connected to a source of cooling medium, and an outlet conduit communicating with said passage for discharging said medium from said passage.

3. The device of claim 1, wherein said connecting means comprises a nut secured to the outer surface of said muffler, and a threaded member connected to said adapter and engaged with said nut.

4. The device of claim 1, wherein said adapter has a pair of opposed ends, said accelerometer connected to one of said ends and said connecting means disposed on the other of said ends.

5. The device of claim 4, wherein said cooling means comprises an inlet conduit providing communication between said passage and a source of cooling medium, and an outlet conduit communicating with said passage for discharging said medium from said passage, said inlet and outlet conduits located between said ends.

6. The device of claim 5, wherein said adapter has a longitudinal axis extending between said ends, said inlet and outlet conduits being disposed generally diametrically of said adapter and being disposed at an acute angle with respect to said axis.

7. A device for measuring the vibrational characteristics of a muffler under operating conditions, comprising a metal adapter having a pair of opposed ends and defining an internal chamber, connecting means for connecting one of said ends to the outer surface of a muffler, an accelerometer secured to the other of said ends and constructed and arranged to measure the vibrational characteristics of said muffler under operating conditions, cooling means for flowing a cooling medium through said chamber and including an inlet conduit for supplying a cooling medium to said chamber and an outlet conduit for discharging said cooling medium from said chamber, said inlet and outlet conduits being disposed between said opposed ends and the axes of said inlet and outlet conduits being disposed at an acute angle with respect to the axis of said adapter.

8. The device of claim 7, wherein said opposed ends are generally flat.

9. The device of claim 7, wherein said adapter is composed of an aluminum alloy.

10. The device of claim 7, wherein said connecting means comprises a first connecting element welded to said muffler, and a second connecting element attached to said adapter and removably engaged with said first element.

11. A device for measuring the vibrational characteristics of a muffler under operating conditions, comprising a metal adapter having a pair of opposed ends and a side wall interconnecting said ends, said adapter defining an internal chamber, connecting means for connecting one of said ends to the outer surface of a muffler, vibrational characteristics measuring means secured to the other of said ends for measuring the vibrational characteristics of the muffler under operating conditions, cooling means for flowing a cooling medium through said chamber and including an inlet conduit for supplying cooling medium to said chamber and an outlet conduit for discharging cooling medium from said chamber, said inlet and outlet conduits being disposed in said side wall and being disposed out of axial alignment.

12. The device of claim 11, wherein said inlet and outlet conduits are each disposed at an acute angle with respect to the axis of said adapter.

* * * * *